April 16, 1946.  M. L. SHULER  2,398,472
DEVICE FOR SECURING TIRES TO THE RIMS OF VEHICLE WHEELS
Filed Nov. 29, 1943
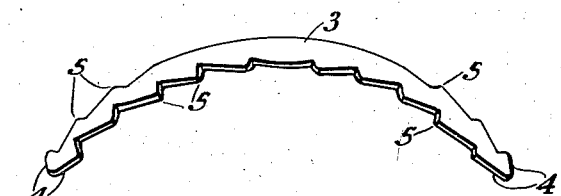
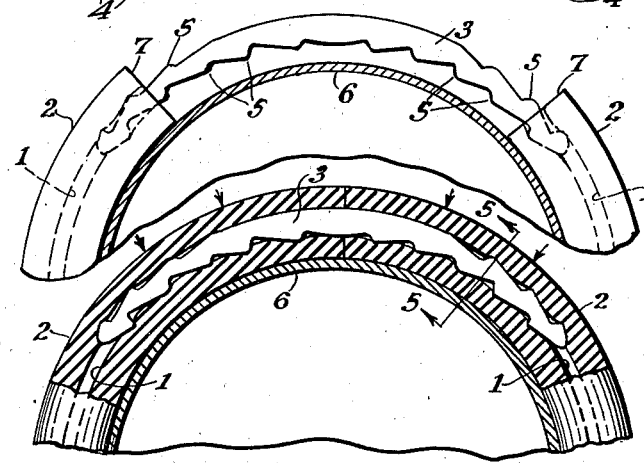
INVENTOR.
MORRIS L. SHULER.
BY Fay, Goldrick, Chilton & Isler
Attorneys.

Patented Apr. 16, 1946

2,398,472

UNITED STATES PATENT OFFICE 2,398,472

DEVICE FOR SECURING TIRES TO THE RIMS OF VEHICLE WHEELS

Morris L. Shuler, Cleveland Heights, Ohio

Application November 29, 1943, Serial No. 512,090

3 Claims. (Cl. 152—375)

This invention relates, as indicated to a connecting device for securing a tire to the rim of a vehicle wheel.

It has heretofore been proposed to secure a tire to a wheel by means of a connecting device consisting of a relatively thin metallic strip curved to conform to the wheel circumference and having edge portions provided with notches forming barbs. This device was open to two objections, (1) the device had to be made in two operations, that is, blanking from a sheet or strip and then bending or forming to conform with the rim circumference of the vehicle wheel, and (2) the device was disposed with its broad surfaces concentric with the axis of the wheel or rim thereby positioning the barbs in such a manner that radial pressure against the wheel in the vicinity of the device had a tendency to cause the barbs to recede from the wall of the opening in the tire in which the device was located, thereby reducing the effectiveness of the connection.

The present invention has as its primary object the provision of a device of the character described, which while resembling in general appearance the aforesaid device, overcomes the objections to such device.

More specifically, the invention contemplates the provision of a device of the character described which can be made in a single blanking or stamping operation, and which, when in use becomes more rather than less efficient and effective in its function as a result of continual radial pressure on the wheel or rim in the vicinity of the device.

Other objects and advantages of the invention will be apparent during the course of the following description.

In the accompanying drawing, forming a part of this specification, and in which like numerals are employed to designate like parts throughout the same, Fig. 1 is a perspective view of a connecting device made in accordance with the invention;

Fig. 2 is a side elevation of a tire, with the rim in section, showing the position of the parts at the beginning of the connecting operation;

Fig. 3 is a similar view, showing the ends of the tire in their final positions;

Fig. 4 is a plan view of a portion of a tire showing the connecting device therein; and Fig. 5 is a transverse cross-sectional view, taken on the line 5—5 of Fig. 3.

Referring more particularly to the drawing, it will be seen that the connecting device comprises an elongated member the end portions of which are adapted for insertion in longitudinal openings 1 in the respective ends of a tire 2, by the relative longitudinal movement of the device and the tire ends, and the end portions of which are provided with barbs adapted to bite into the material of the tire, usually rubber, and prevent the separation of the tire ends.

The connecting device is preferably punched or stamped, in a single operation, from sheet or strip steel, it being noted that the device is normally of such size and shape as to readily adapt it to be made from small pieces of strip or sheet, such as scrap or from seconds. The device consists of a relatively thin metallic strip 3 of arcuate form, the arc corresponding generally to the circumference of the rim of the vehicle wheel to which the tire is to be secured, and has its ends tapered as at 4 to facilitate entry of the device into the openings 1 in the tire, and both edges provided with notches to form barbs 5, the barbs at one edge being preferably in staggered relation to those at the other edge. The barbs have their forward edges, that is the edges adjacent to the ends of the strip, inclined or tapered so that when the strip is inserted in the opening 1 in the tire, the material of the tire, rubber in this instance, will be displaced as the barbs are forced past the same and will then contract at the rear end of the barb so that the latter will firmly engage the material and prevent the separation of the strip and tire. The barbs on the two end portions of the connecting device face in opposite directions that is, toward the transverse center line of the strip. The overall width of the strip is somewhat greater than the diameter of the opening 1 in the tire so that the barbs will project into the rubber of the tire a substantial distance and will provide a very firm strong connection.

In connecting the tire with the wheel, the tire 2 is placed in position on the rim 6 with its ends 7 separated a distance substantially equal to the length of the connecting device, the pointed ends of the connecting device are then inserted in the openings 1 of the tire, and the device is thereby supported in its proper position with relation to the rim and to the tire. Pressure is then applied to the two ends of the tire to move the same lengthwise, one toward the other. This movement is relative to the connecting device and as the ends of the tire approach one another they will envelop the respective end portions of the connecting device and the two ends of the tire will meet in abutting contact at approximately the transverse center line of the connecting device. The barbs on the connecting device hold the end portions of the tire in the position to which they have been moved and positively prevent the separation thereof. The abutment of the ends 7 with each other will be facilitated if such ends are cut on a slight bias, as will be readily understood.

It will be noted that the present device can be punched or stamped in a single operation from sheet or strip steel, and to the final arcuate form in which it is desired. This renders unnecessary bending or forming the device into arcuate or curved form, as a second operation.

Moreover, the device instead of being disposed with its broad surfaces or dimension concentric with the axis of the wheel or rim is disposed with such surfaces or dimension in a plane which is normal to the axis of the wheel or rim, that is to say, in the plane of the wheel or rim. This results in the barbs being likewise disposed in such a "normal" plane, so that radial pressure against the wheel, as indicated by the arrows in Fig. 3, that is, radial pressure against the wheel in the vicinity of the connecting device, which is virtually the only pressure to which the wheel and tires are subjected, causes the barbs to more firmly grip the walls of the openings 1 in the tire, a condition greatly to be desired, since it insures against separation of the tire from the rim throughout the life of the tire. The greater this pressure, moreover, the more firm and positive the gripping engagement between the tire and the connecting device. This is in direct contrast to the condition which prevails when radial pressure is directed against the wheel as in the aforesaid prior art device.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. In combination with a wheel having a rim and a tire mounted on said rim; a device connecting the ends of said tire, said device comprising an elongated member of arcuate form conforming with the curvature of the rim and having a cross-section which is of greater dimension in a plane perpendicular to the axis of said wheel than in a plane normal to said first-named plane, and barbs extending from said member, said barbs disposed in the plane of said member having the greater dimension.

2. In combination with a wheel having a rim and a tire mounted on said rim; a device connecting the ends of said tire, said device comprising an elongated member of arcuate form conforming with the curvature of said rim and having broader surfaces in a plane normal to the axis of said rim than in a plane normal to said first-named plane, and barbs extending from said member and into the tire, said barbs also disposed in a plane normal to the axis of said rim.

3. In combination with a wheel having a rim and a tire mounted on said rim, said tire having longitudinal openings in its respective ends; a device connecting the ends of said tire, said device comprising an elongated member of arcuate form and having its ends disposed in said openings, said member having a cross-section having a broad and narrow dimension, the broad dimension being disposed in a plane normal to the axis of said rim and the narrow dimension parallel to said axis, and barbs extending from the broad dimension substantially radially of said member and into gripping engagement with the walls of said openings.

MORRIS L. SHULER.